United States Patent [19]

Alcorn

[11] 4,054,919

[45] Oct. 18, 1977

[54] VIDEO IMAGE POSITIONING CONTROL SYSTEM

[75] Inventor: Allan E. Alcorn, Campbell, Calif.

[73] Assignee: Atari Incorporated, Los Gatos, Calif.

[21] Appl. No.: 613,050

[22] Filed: Sept. 15, 1975

[51] Int. Cl.[2] .................... H04N 5/04

[52] U.S. Cl. .................... 358/148; 358/160

[58] Field of Search .................... 178/69.5 TV, 5.8 R, 178/6.8; 340/324 AD; 273/DIG. 28; 358/148, 160

[56] References Cited

U.S. PATENT DOCUMENTS 3,659,285 4/1972 Baer et al. .................... 178/5.8 R X 3,793,483 2/1974 Bushnell .................... 178/69.5 TV

*Primary Examiner*—Richard Murray

*Assistant Examiner*—Mitchell Saffian

[57] ABSTRACT

For controlling the direction and rate of movement of an image on a raster scan display, a first set of counters is arranged to generate digital pulses for use as horizontal and vertical sync pulses for use in conjunction with a video adder for controlling the image on the display. Means, such as a second set of counters, driven by another clock means, provides an output which is compared to that of the first named counters to provide information signals to the video adder for controlling the location and movements for the image being displayed.

2 Claims, 4 Drawing Figures

VIDEO IMAGE POSITIONING CONTROL SYSTEM

BACKGROUND OF THE INVENTION

This invention pertains to a raster scan display image control system, such as for causing a video image to be displayed on a video display tube and to travel or be positioned selectively in a plurality of directions or at a plurality of locations on the tube. This invention is particularly useful in conjunction with, though not necessarily limited to, entertainment devices of the kind wherein images are displayed on video tubes or other raster scan displays and controlled by an operator.

While it will be evident that this invention has application for use with various raster scan displays, the invention herein will be described in terms of a video display of a type requiring synchronizing signals for control of a raster scan thereof, such as a television receiver.

SUMMARY OF THE INVENTION AND OBJECTS

In general, in a video image control system for causing a video image to be displayed on a video display tube there has been provided herein a system including pulse generating clock means for generating a continuous stream of signals at a predetermined frequency. A first counting means coupled to count the signals and to provide a first output signal in response to attainment of a predetermined count as well as a second output signal in response to attainment of a multiple of the foregoing predetermined count serve to generate digital pulses for use as horizontal and vertical sync pulses employed in conjunction with a video adder for controlling the image on the video display. The video adder receives and combines a composite sync signal comprised of horizontal and vertical sync pulses with information signals to provide a composite video signal to be coupled to the video display tube. Thus, the video adder is arranged to receive the composite sync signals of the first counting means.

Means for generating an information signal to be added to the composite sync signals by the adder includes means for generating a count to be compared to the count represented by the first output signal. The speed with which the image of an object projected on the video display tube moves in a given direction is determined by the continuously compared differences between the count of the first output signal and the count of the last named means for generating a count.

Thus, means for comparing the count in the second counting means with the count in the first counting means serves to generate and supply an information signal to the adder for providing the composite video signal thereof with information to be displayed.

According to a preferred embodiment herein, means are provided for selectively varying the frequency of the clock pulses from a position externally of the cabinet containing the system so as to vary the count of the second counting means to vary the rate of movement of the image of the information signal on the video display tube.

In general, it is an object of the present invention to provide an improved video image control system employing digital techniques for generating horizontal and vertical sync pulses to synchronize a raster scan display (such as, but not limited to, a television screen) while using other digital devices to generate images on the display in which the speed with which an image moves in a given direction is determined by the frequency of clock pulses fed to counters controlling the supply of information signals.

The foregoing and other objects of the invention will be more readily evident from the following detailed description of preferred embodiments.

DETAILED DESCRIPTION OF PREFERRED EMBODIMENTS

Figure 1:
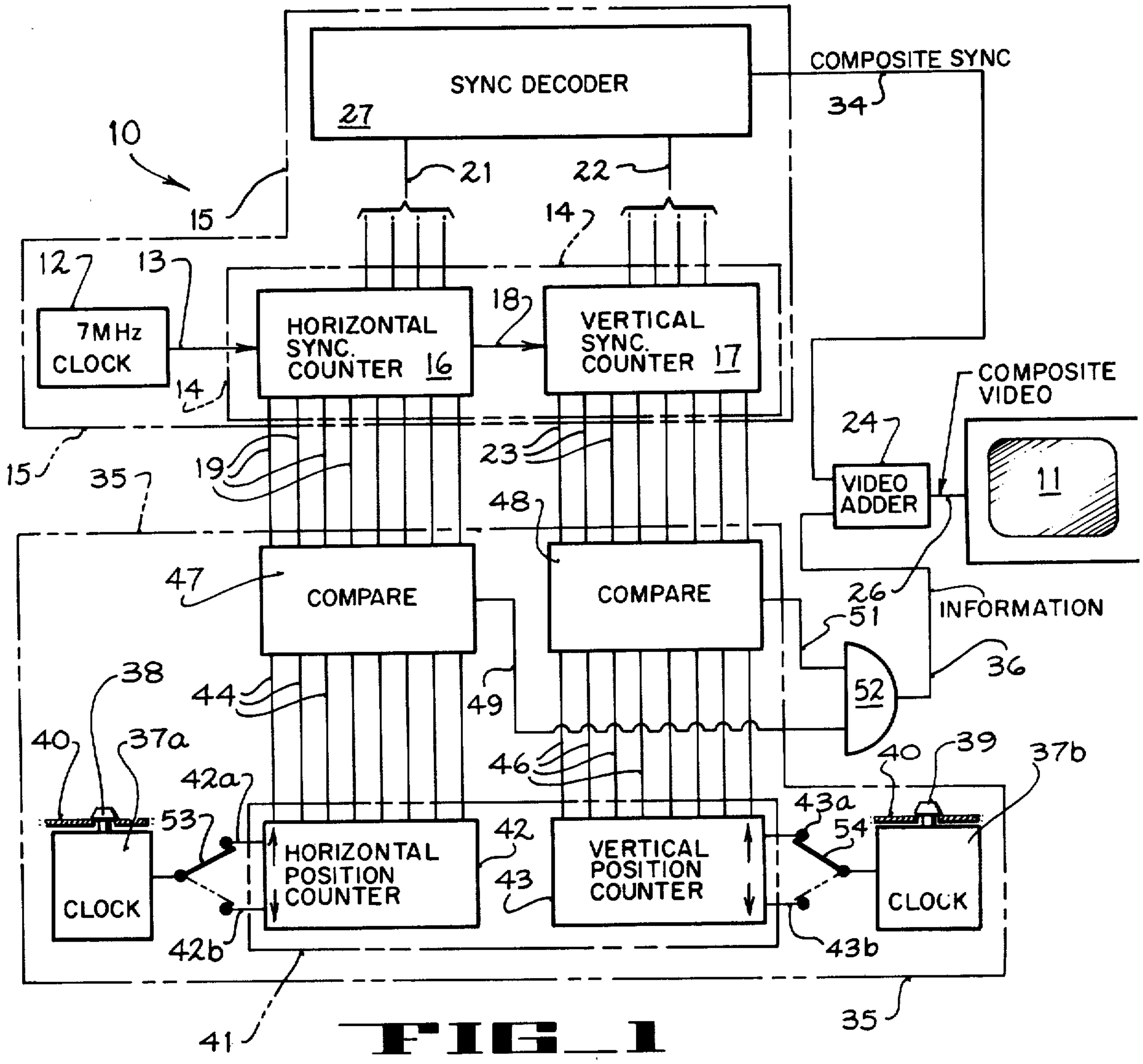
FIG. 1 shows a diagrammatic view of a system according to the invention.

FIG. 1 discloses a video image control system 10 for controlling the location and movements of a video image to be displayed on a video display tube 11. The image can be caused to travel selectively thereon in a plurality of directions and at varying rates and includes a pulse generating clock means 12 for generating a continuous stream of signals at a predetermined frequency as schematically represented on line 13, such as a 7 MHz pulse generator.

Means 15 forms a source of composite sync signals of a type adapted to be combined with information signals to provide a composite video input on lead 26 to video display 11. Means 15 includes the high speed clock 12 coupled to drive a first counting means 14 comprising the horizontal sync counter 16 and vertical sync counter 17 coupled thereto. Predetermined stages of both counters 16 and 17 respectively represented as inputs 21, 22 to a sync decoder circuitry 27 of known type are combined to provide a composite sync signal on lead 34 traced to adder 24.

Thus, a composite sync signal is thus supplied via lead 34 to video adder 24 by known means in which sync decoder circuitry 27 is coupled to receive outputs shown as 21, 22 from predetermined stages of both horizontal and vertical sync counters 16, 17 forming unit 14.

Sync counter 16 serves to count the pulses arriving via line 13 and provide a first output signal on line 18 upon attainment of a predetermined count represented by signals on the eight output leads 19 (each representing a binary stage in the binary digital counter 16). The pulses traveling via line 18 into vertical sync counter 17 serve to cause counter 17 to provide a similar predetermined count represented by signals on the eight output leads 23 (each representing a binary stage in the binary digital counter 17).

A video adder 24 of known type for receiving and combining a composite sync signal comprised of horizontal and vertical sync pulses with an information signal provides a composite video signal as on lead 26. Accordingly, the video tube 11 is readily synchronized.

Information signals are provided from a control unit 35 via lead 36 to adder 24 so as to generate the composite video signal on lead 26 as earlier noted, and such information signals are provided in the manner now to be described by unit 35.

Unit 35 comprises a second pulse generating clock means in the form of clocks 37*a*, 37*b* to generate signals selectively at one of a plurality of frequencies as indicated by each of the adjustable knobs 38, 39, manually operable from a position externally of the cabinet 40. A second counting means 41 is operatively coupled to count the signals from the second clock means 37*a*, 37*b* to provide a count therefrom at a rate responsive to the rate of the second clock signals.

Second counting means 41 comprises two portions whereby each of a pair of binary digital counters 42, 43 provided with eight stages represented by the output leads 44, 46 respectively is of known type in which clock pulses supplied to one lead, such as lead 42*a*, causes the counter to count "upwardly" or in increasing value and when the pulses are fed to the other lead 42*b*, counter 42 counts in decreasing value or "downwardly".

The foregoing holds true also for counter 43 as where 43 counts in an increasing value when pulses are applied to lead 43*a* and in a decreasing value when pulses are applied to lead 43*b*.

Means for comparing the count in the second counting means 41 for those portions 42, 43 thereof with the count in the first counting means 14 includes comparing circuits 47, 48. The comparators 47, 48 need not necessarily compare every single bit represented on leads 19, 44 and leads 23, 46 as they appear in the digital counters 16, 42 and 17, 43 using known comparator theory, since it has been observed that the comparators can compare the most significant bits to produce a wider and wider spot. For example, if the binary counters are of length nine and the seven most significant bits are compared, this will leave a spot or image that is four clock units wide.

Accordingly, there has been provided means for comparing a count of the second counting means 41 with a count of the first counting means 14 to generate and supply an information signal via leads 49, 51 coupled to an AND gate 52 whereby, upon concurrence of the appropriate signals on leads 49, 51, information signals will be passed via lead 36 to adder 24 to provide the composite video signal thereof with its information portion to be displayed.

The means represented by the knobs 38, 39 represents means for selectively varying the frequency of the respective portions of the second clock means 37*a*, 37*b* so as to vary the rate of movement of the image of the information signal on video display tube 11 in the horizontal and vertical directions.

Clock means 37*a*, 37*b* shown in FIG. 1 can constitute, for example, two individual clock pulse generators individually adjustable or a single clock pulse generator in which any adjustment to the rate of clock pulses would be applied simultaneously to both counters 42, 43. Accordingly, there is an advantage as shown in FIG. 1 for independently supplying separate clock generators 37*a*, 37*b* with their own associated adjusting knobs or other means as represented schematically by knobs 38, 39.

Means for making the switching connections between input leads 42*a*, 42*b* and clock 37*a* as well as the connections to clock 37*b* are diagrammatically represented simply by the switch armatures 53, 54 since it will be readily understood that any suitable switching means can be employed for coupling the output pulse train of the clocks 37 to their associated horizontal and vertical position counters 42, 43.

From the foregoing, it should be readily evident that the relative pulse rate and position of switch arms 53, 54 will determine the speed and direction of movement of the object on display 11.

Figure 2:
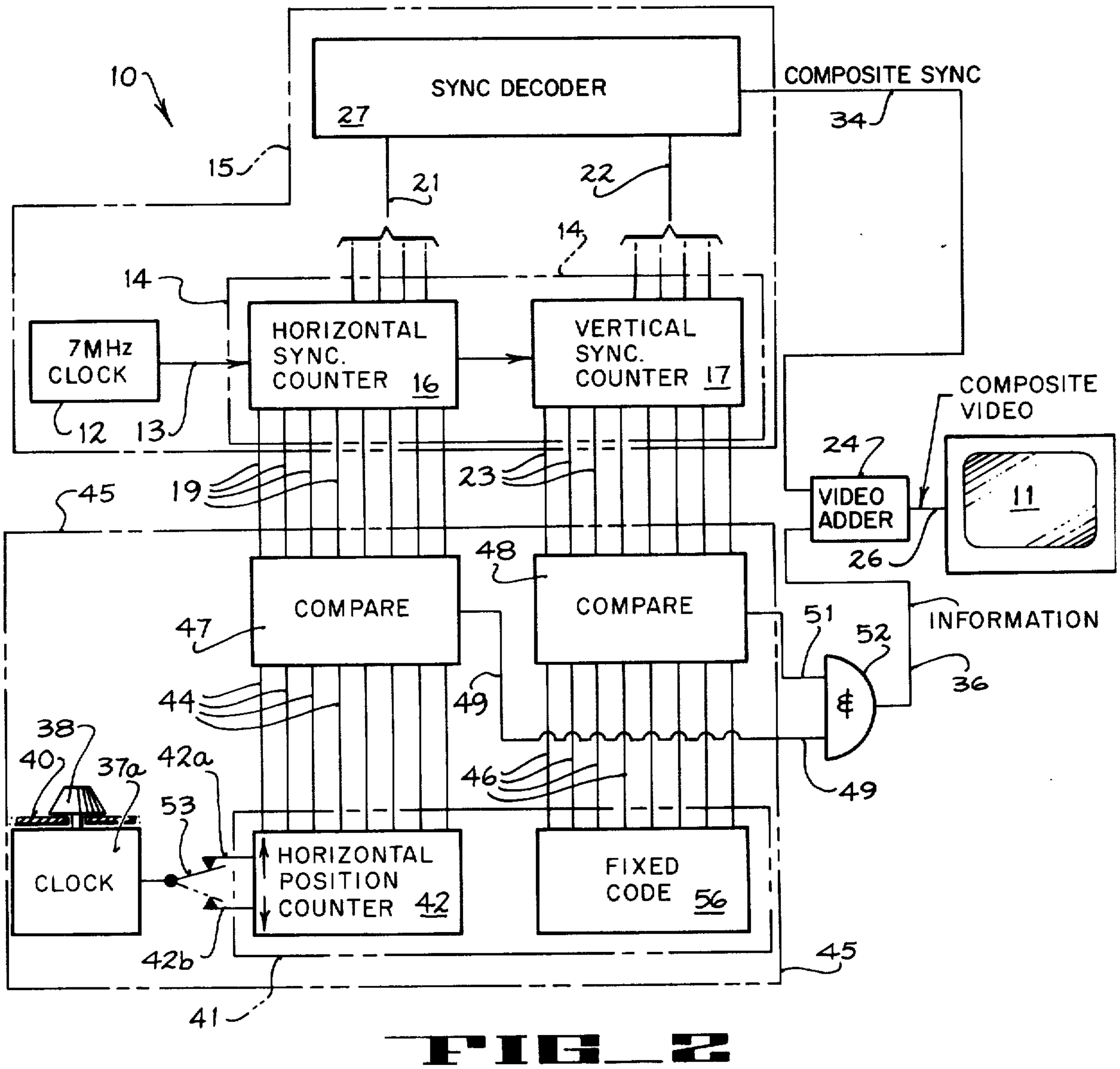
FIG. 2 shows a diagrammatic view of a system according to a second embodiment of the invention.

According to another embodiment of the invention as shown in FIG. 2, there has been provided a system of the kind described above wherein one of the two clocks 37*a*, 37*b* has been removed along with the vertical position counter 43 and the latter has been replaced by suitable means providing simply a "fixed code" 56 of known type for establishing a prefixed state or count on the stages represented by leads 46. Thus, the box identified as 56 could, for example, be represented by a sequence of eight switches, each coupled to leads 46 and disposed variously in a particular state so as to provide a binary count on leads 46 to establish a fixed vertical portion to the information signal on lead 36.

Similarly, the conditions could be reversed whereby the horizontal position counter 42 could be replaced by means of a fixed code 56, and the vertical position counter retained in which case clock 37 would feed the vertical position counter as opposed to being coupled to horizontal position counter 42.

Figure 3:
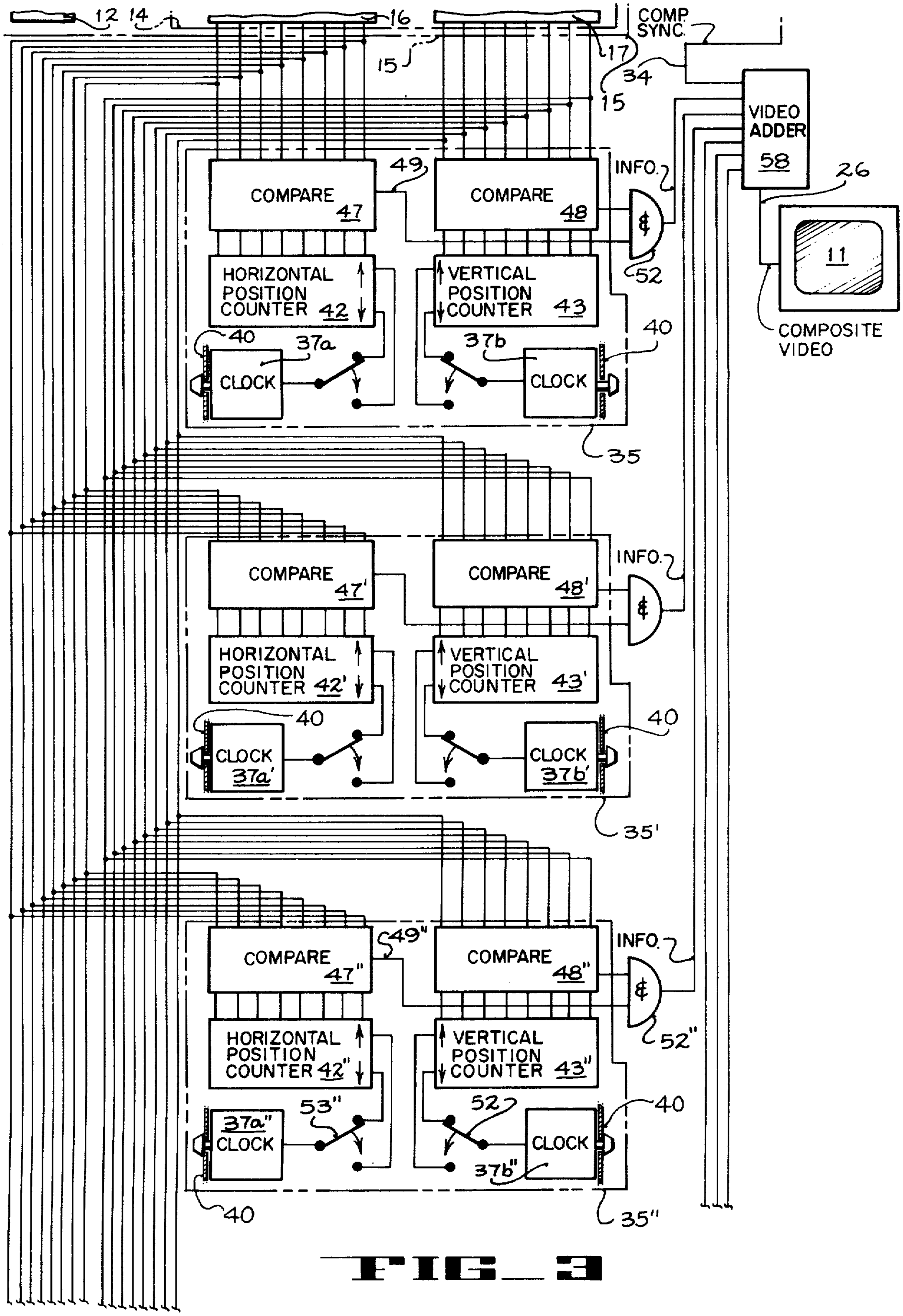
FIG. 3 shows a diagrammatic view according to another embodiment of the invention generally demonstrating the application of the embodiment shown in FIG. 1.

A system 57, according to another embodiment of the invention as shown in FIG. 3, includes means for generating composite synchronizing signals as described above in addition to having a series of information generating units 35, 35', 35'', each having variable clocks, counters and comparators of the type described above with regard to FIG. 1 whereby selectively controlled information can be supplied from each to provide a number of variably controlled images on video display tube 11 via the video adder 58.

Figure 4:
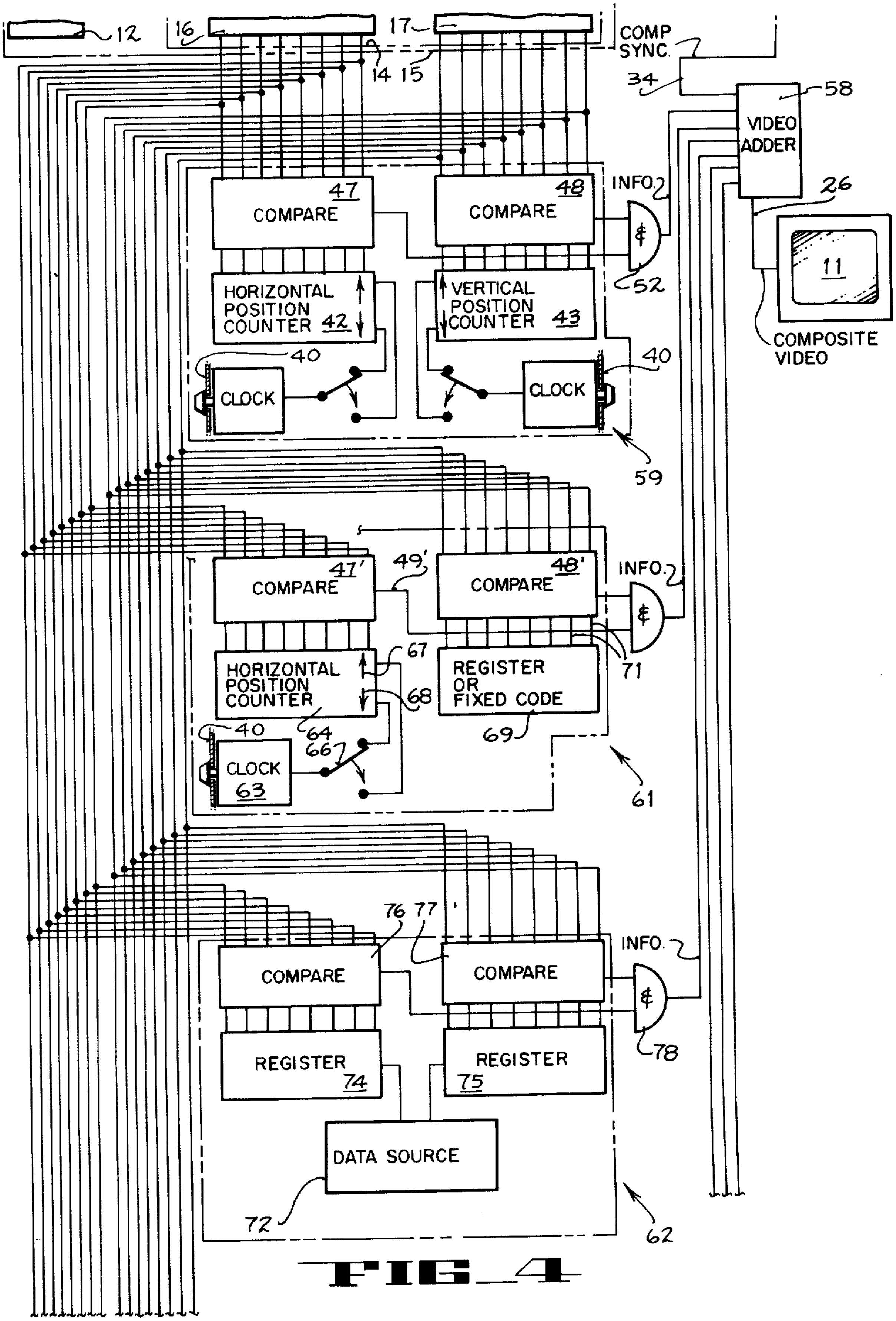
FIG. 4 shows another embodiment of the invention generally demonstrating the application of the embodiment shown in FIG. 1 and 2 and otherwise.

The embodiment shown in FIG. 4 shows a series of information generating units 59, 61, 62 for providing various images on video display tube 11 as now to be described.

Unit 59 comprises a pair of variable frequency clocks coupled to drive associated counters to an increasing value or decreasing value depending upon the position of an associated switch armature. The count in the counters is to be compared in a pair of comparators in the manner noted above with regard to the embodiment in FIG. 1.

Unit 61 comprises a variable frequency clock 63 coupled in the manner described above to a horizontal position digital counter 64 so as to count up or count down depending upon the condition of the switch armature 66. In this regard, the arrows 67, 68 pointing upwardly and downwardly pertain to increasing and decreasing values in the counters to which they are associated. Thus, pulses being fed to counter 64 via switch armature 66 in its presently shown closed condition will serve to count the value in counter 64 downwardly as represented by arrow 68.

Unit 61, however, includes means for establishing a stable, predetermined count by means of a fixed code 69 providing a predetermined count to the eight stages represented by the leads 71.

Unit 62 includes means providing an output count for comparison employing a data source 72 coupled to shift registers 74, 75 respectively and in which the stages of the shift registers 74, 75 provided a count while being individually coupled to the compare units 76, 77 so that an information signal can be derived via the AND gate 78 in accordance with the information supplied from data source 72. Data source 72 can provide varying or constant data as from a computer to contribute yet another type of image to the display on tube 11.

From the foregoing, it will be readily evident that in the embodiments shown in FIGS. 3 and 4 and even in combining the embodiments of FIGS. 3 and 4 as desired, a great number of images can be displayed with relative simplicity on a video display tube while sharing the common expense of some of the more expensive portions of the equipment, such as adder 24, the high speed clock 12 and the remaining portions of the system for providing a composite sync signal on line 34. By sharing the foregoing expense, the price per image demonstrated on each video display is commensurately reduced to a large extent.

I claim:

1. In a video image control system of a type disposing a video image on a raster scan display, said system including pulse generating clock means for generating a continuous stream of signals at a predetermined frequency, first counting means coupled to count said signals and first output means providing a first output count in response to attainment of a predetermined count and second output means providing a second output count in response to attainment of a multiple of said predetermined count, a video adder of a type for receiving and combining composite sync signals and information signals to provide a composite video signal to be coupled to said display, means for generating composite sync signals and for supplying same to said adder, means for generating information signals and for supplying them to said adder to cause an image to move on the display, the last named means comprising a register, a digital counter, and second clock means serving to continuously generate clock pulses to the last named digital counter to provide a count from same at a rate responsive to the frequency of the last named clock pulses to be compared with one of said first and second output counts, said register providing an output to be compared with the other one of said first and second output counts, and means for comparing the count of said register and last named digital counter with the count of said first counting means to generate and supply an information signal to said adder for providing the composite video signal thereof with information to be displayed.

2. In a video image control system of a type adapted to be contained in a cabinet for disposing a video image on a raster scan display, said system including a pulse generating clock means for generating a continuous stream of signals at a predetermined frequency, counting means coupled to count said signals and first output means providing a first output count in response to attainment of a predetermined count and second output means providing a second output count in response to attainment of a multiple of said predetermined count, a video adder of a type for receiving and combining composite sync signals and information signals to provide a composite video signal to be coupled to said display, means for generating composite sync signals and for supplying same to said adder, and means for generating information signals and for supplying same to said adder for causing an image to move on the display, the last named means including a data source and a register coupled to said source to receive data therefrom, and means for comparing the output of said register with an output of said counting means to generate and supply a portion of an information signal to said adder for providing the composite video signal thereof with information to be displayed.

* * * * *